Figure 1:
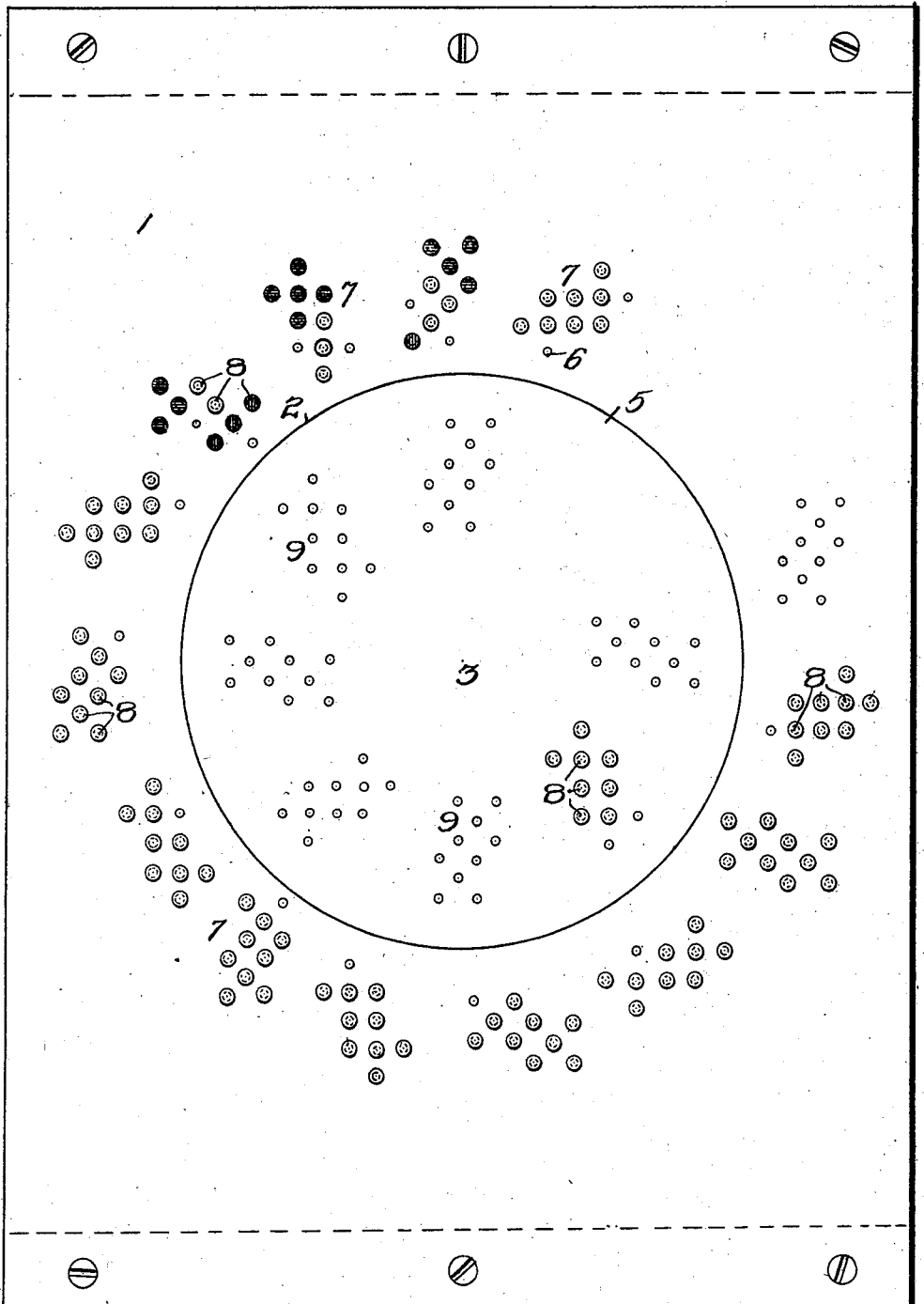

No. 720,510. PATENTED FEB. 10, 1903.
W. C. WILLIAMS.
EDUCATIONAL DEVICE.
APPLICATION FILED JULY 31, 1902.

NO MODEL. 2 SHEETS—SHEET 1.

Witnesses
W. C. Williams, Inventor.
by
Attorneys

No. 720,510. PATENTED FEB. 10, 1903.
W. C. WILLIAMS.
EDUCATIONAL DEVICE.
APPLICATION FILED JULY 31, 1902.
NO MODEL. 2 SHEETS—SHEET 2.
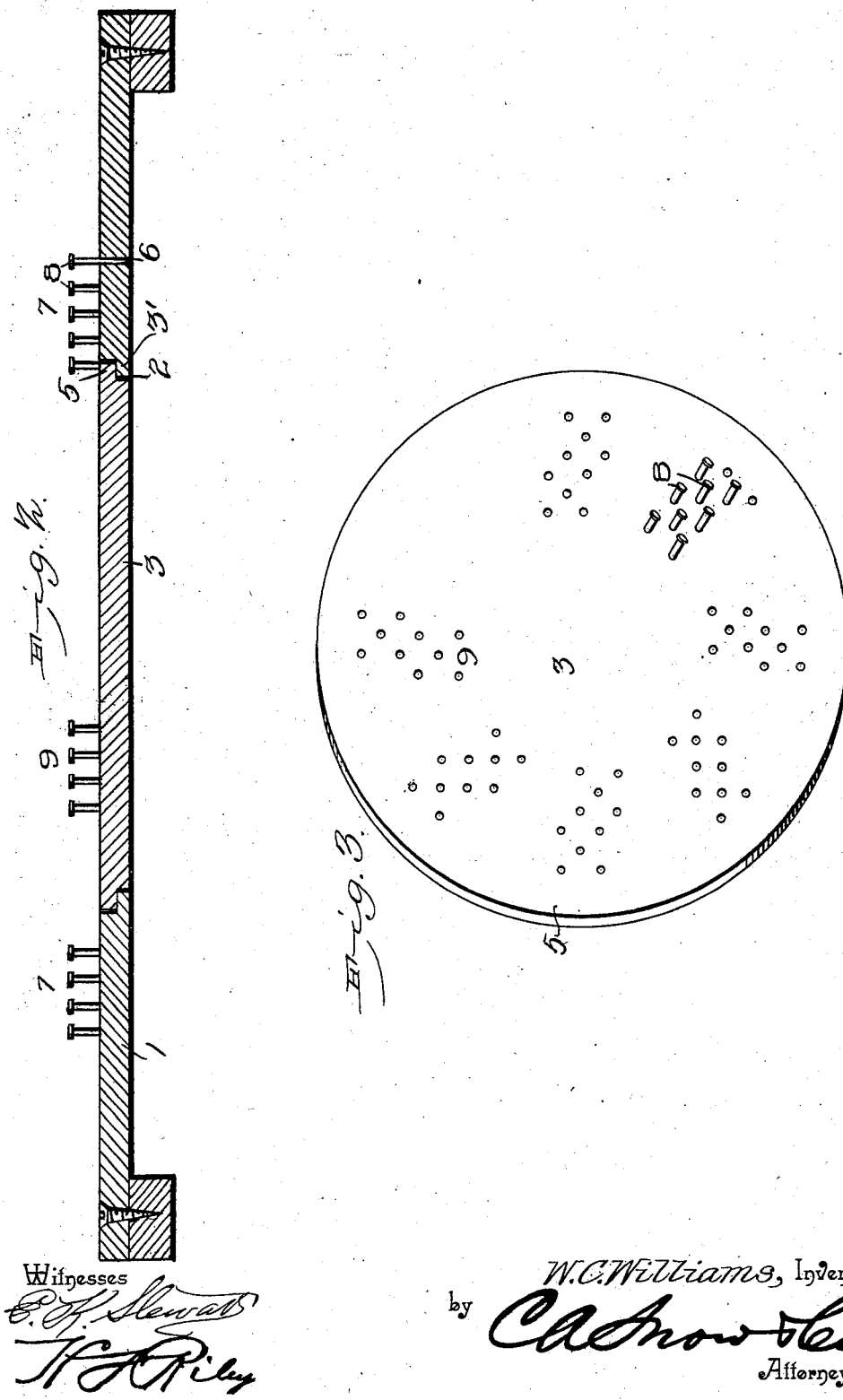
Witnesses
W. C. Williams, Inventor.
by C. A. Snow & Co
Attorneys

UNITED STATES PATENT OFFICE.

WILLOUGHBY COLUMBUS WILLIAMS, OF SAN ANTONIO, TEXAS.

EDUCATIONAL DEVICE.

SPECIFICATION forming part of Letters Patent No. 720,510, dated February 10, 1903.

Application filed July 31, 1902. Serial No. 117,863. (No model.)

*To all whom it may concern:*

Be it known that I, WILLOUGHBY COLUMBUS WILLIAMS, a citizen of the United States, residing at San Antonio, in the county of Bexar and State of Texas, have invented a new and useful Educational Device, of which the following is a specification.

The invention relates to improvements in educational devices.

The object of the present invention is to improve the construction of educational devices and to provide a simple and comparatively inexpensive one designed for teaching addition, multiplication, subtraction, and division and capable of enabling the same to be explained with greater ease and at the expenditure of much less energy of both pupil and teacher than heretofore.

A further object of the invention is to provide a device of this character adapted to permit such mathematical operations to be performed and explained with ten as a basis of all calculation and capable of enabling pupils to obtain a clear perception of the principles involved in such calculations and to become thoroughly familiar with a few concrete numbers and results, and thereby avoid taxing the memory with numerous abstract results.

The invention consists in the construction and novel combination and arrangement of parts, hereinafter fully described, illustrated in the accompanying drawings, and pointed out in the claims hereto appended.

In the drawings, Figure 1 is a plan view of an educational device constructed in accordance with this invention. Fig. 2 is a sectional view of the same. Fig. 3 is a detail view of the rotary disk or member.

Like numerals of reference designate corresponding parts in all the figures of the drawings.

1 designates an educational device consisting, preferably, of a board provided with a central circular opening 2 for the reception of a rotary disk or member 3 and having at the said opening a grooved or rabbeted edge forming a supporting-shoulder 3, which is adapted to receive and form a seat for an annular flange 5 of the rotary disk or member. The rotary disk or member is provided with a peripheral groove or rabbet to form the annular flange 5, and the upper face of the rotary disk or member is flush with the upper or outer face of the board. The board and the rotary disk or member may be constructed of any suitable material, and it may, of course, be in the form of a chart, and when constructed of thin material the rotary disk or member may be mounted upon the chart without recessing the latter, and I desire it to be understood that these and similar changes within the scope of the appended claims may be resorted to without departing from the spirit or sacrificing any of the advantages of this invention.

The board is provided around the circular opening with a series of sockets 6, arranged in groups 7 of ten, and any desired number of groups may be employed. The sockets 6 of each group are preferably arranged, as shown, with two transverse rows of three, a central row of two, and a pair of end sockets. The rows of three extend from opposite sides of the central row of two, the extra or end socket of one row of the threes being located at one side of the group and the opposite end socket of the other row of threes being located at the opposite side of the group. The end socket at one end of the group is arranged in alinement with one of the sockets of the central row of two, and the other end socket is arranged in alinement with the other socket of the central row of two; but any other arrangement may be employed for enabling the pins or pieces hereinafter described to be arranged in readily-distinguishable auxiliary rows or groups for enabling the units or elements of a number to be readily seen. The pins or pieces 8, which are adapted to be arranged in the sockets as hereinafter explained, are in practice designed to be provided with heads or tufts of the primary colors to avoid impairing the eyesight of the pupils and to enable the elements of a number to be readily distinguished. A number may consist of a series of groups of three, and these groups may be composed of pins of different colors, the pins of each auxiliary group being composed of pins of the same color in order to distinguish the several auxiliary groups from one another.

The educational device is designed for teaching addition, multiplication, division, and subtraction and in explaining and performing such calculations. The tens groups surrounding the rotary disk or member are built up and completed or torn down, thereby making ten the central idea or basis of all such calculations and affording an easy method of enabling pupils to obtain a clear perception of the principles involved in such calculations by the aid of a few simple numbers and results and without taxing the memory. The rotary disk or member is adapted to be successively turned to bring a group of pins successively opposite groups of pins surrounding the rotary disk or member to enable the pins of the outside groups to be changed in connection with the inside group by transferring a pin or pins from one group to the other. The rotary disk or member is provided with a series of groups 9 of sockets 10, arranged in the same manner as the groups surrounding the rotary disk or member.

The ninth line of multiplication will demonstrate the manner in which the educational device may be employed, and the device is arranged for performing this operation by placing nine pegs or pieces in each of nine groups outside the rotary disk or member and then placing nine pegs in one group inside of the rotary disk or member. In each case leave a corner-socket empty adjacent to the rotary disk or member. Turn the rotary disk or member until two nine groups lie opposite each other. Then remove one of the pegs or pieces of the nine group of the rotary disk or member and place it in the corner-socket of the outside group, thereby completing the latter, making a ten or teen outside and leaving eight pins or pieces inside, thereby indicating eighteen or that two nines equal eighteen. Now turn the rotary disk or member until the eight group comes opposite the next nine group to perform the operation of multiplying nine by three. Transfer one of the pins or pieces from the eight group of the rotary disk or member to the adjacent outside group, thereby completing the latter and making a second ten or teen, the result of the continuous operation being two tens and a seven, or twenty-seven, three nines making twenty-seven. This operation may be continued until all of the pins or pieces within the rotary disk or member have been transferred to the outside groups, which are thus completed.

To prepare the board for teaching the eighth line of multiplication, two pegs or pieces are removed from the outside groups, and these pegs or pieces taken from the outside groups are placed in two groups of eight within the rotary disk or member, and the superfluous pegs or pieces are laid aside. The rotary disk or member is then rotated as before, removing two pegs or pieces from the inside to complete the outside groups. In this manner the educational device may be used for teaching mathematics, and in each operation ten will be the basis or central idea. In subtracting nine from a number the pegs or pieces of the inner and outer groups may be arranged to form digits of different numbers, and by simply removing one peg from the tens digit and placing it in the unit digit the result will be quickly obtained. For instance, in subtracting nine from eighteen the one of the tens digit is removed and added to the units digit, making nine—the answer. In adding nine one is taken from the units digit and added to the tens digit. In adding nine to eighteen one is taken from the eight and added to the one, leaving seven in the units digit and making two in the tens digit, the result being twenty-seven. Division may be clearly indicated by designating the elements by different colors. Besides rendering such operations easy, they will also be found pleasing and attractive to children, who will become readily familiar with the various operations and principles involved in such calculations.

Any digit subtracted from a digit which is one less than that digit leaves nine, because you only need borrow one out of the tens-column to make the right-hand digit of the subtrahend larger. On the same principle eight subtracted from any number leaves two pegs more than the digit subtracted from, as eight from fourteen leaves six, six being two more than four. Conversely, any digit from a digit two less leaves eight, as six from fourteen leaves eight, four of the fourteen being two less than six. This can be profitably carried into sevens, as any digit from a digit three less leaves seven. In teaching division the number to be divided may be arranged in groups of distinctive colors to enable children to actually see the quantity. In fifteen the three fives may be designated by different colors, and in dividing larger numbers—as, for instance, seventy-two into eights—the contiguous groups will be of different colors to enable them to be clearly distinguished. Each number or digit has a corresponding number in the tens making, and one will be constantly associated with the other and with the ten idea. Nine times any number is one less than such number in the tens place and a unit digit, which added to the tens digit makes nine—as, for example, nine nines are eighty-one—eight being one less in the tens digit than nine, and one, the units digit, being the number added to eight to make nine. Nine eights are seventy-two, the seven being one less than eight, and the units digit two being the number necessary to be added to seven in order to make nine. In the example if three pencils cost seven cents, what will twelve pencils cost, the old way of using abstract digits causes the child to think of the digits "1" and "2" of the twelve rather than as twelve quantities of four groups of three; but by the use of the board the child may see in twelve four groups of three and will readily perceive that twelve pencils would cost four times as much as three, or twenty-eight cents. In the example if four pencils cost nine cents, what will eight pencils cost, the child will readily perceive that eight contains two quantities of four and that eight pencils will cost just twice as much as four pencils. Also in comparing eight and twelve we see that eight contains two fours and twelve three fours, and in this manner the child will readily comprehend that eight is two-thirds of twelve. Multiplication can be taught up to the tenth line and after passing the tenth line the rest is mere repetition, and by means of the educational device about eight-ninths of the energy employed in memorizing in connection with mathematics as usually taught is saved. Also rapid calculation or addition may be taught by selecting from a column of figures all of the numbers which combined make ten, such as seven and three, six and four, five and five, eight and two, nine and one, and this will reduce the actual addition to a few numbers. Various other examples might be given in which the educational device can be advantageously employed; but this is deemed unnecessary, as it is thought that the construction, operation, and advantages of the educational device will be clearly apparent from the foregoing description, taken in connection with the accompanying drawings.

What I claim is—

1. An educational device provided with a series of stationary pieces receiving devices arranged in groups of ten, said educational device being also provided with a rotary member having piece-receiving devices, substantially as described.

2. An educational device comprising a body provided with sockets arranged in groups of ten, a movable member also provided with sockets, and pieces adapted to fit removably in the sockets, substantially as described.

3. An educational device comprising a board having a series of sockets arranged in groups of ten, a rotary member provided with sockets adapted to be brought successively opposite the said groups, and pieces adapted to be removably arranged in the said sockets, substantially as described.

4. An educational device comprising a board or body, a movable member arranged thereon, a series of movable devices or pieces adapted to be transferred from the movable member to the board or body and vice versa, and means for supporting the movable devices or pieces on the board or body and the movable member, said means being arranged on the board or body in groups of ten, substantially as described.

5. An educational device comprising a board or body, a movable member arranged thereon, a series of movable pieces provided with distinguishing means and adapted to be arranged on the movable member and on the board or body, and means for supporting the movable pieces and for enabling the same to be arranged in groups of ten, substantially as described.

6. An educational device comprising a board provided with an annular series of sockets arranged in groups of ten, a rotary member mounted on the board within the series of groups and provided with groups of sockets, and removable pieces adapted to fit in the sockets, substantially as described.

In testimony that I claim the foregoing as my own I have hereto affixed my signature in the presence of two witnesses.

WILLOUGHBY COLUMBUS WILLIAMS.

Witnesses:
R. L. STANFIELD,
J. D. SIPPLE.